United States Patent
Derakhshani et al.

(10) Patent No.: US 7,327,860 B2
(45) Date of Patent: Feb. 5, 2008

(54) CONJUNCTIVAL SCANS FOR PERSONAL IDENTIFICATION

(75) Inventors: Reza Derakhshani, Roeland Park, KS (US); Arun Ross, Morgantown, WV (US)

(73) Assignees: West Virginia University, Morgantown, WV (US); The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 11/416,052

(22) Filed: May 2, 2006

(65) Prior Publication Data

US 2006/0280340 A1 Dec. 14, 2006

Related U.S. Application Data

(60) Provisional application No. 60/677,723, filed on May 4, 2005.

(51) Int. Cl.
*G06K 9/00* (2006.01)
(52) U.S. Cl. ..................................................... 382/117
(58) Field of Classification Search ............... 382/115, 382/117; 348/78; 351/206; 340/5.52, 5.53, 340/5.82, 5.83
See application file for complete search history.

(56) References Cited

U.S. PATENT DOCUMENTS

| | | | | |
|---|---|---|---|---|
| 4,998,533 | A * | 3/1991 | Winkelman | 128/637 |
| 6,247,813 | B1 | 6/2001 | Kim et al. | 351/206 |
| 6,526,160 | B1 | 2/2003 | Ito | 382/117 |
| 6,665,426 | B1 * | 12/2003 | Kim | 382/117 |
| 2003/0002722 | A1 * | 1/2003 | Jay et al. | 382/128 |
| 2004/0146187 | A1 | 7/2004 | Jeng | 382/117 |
| 2005/0008200 | A1 | 1/2005 | Azuma et al. | 382/117 |
| 2005/0008201 | A1 | 1/2005 | Lee et al. | 382/117 |
| 2005/0270386 | A1 * | 12/2005 | Saitoh et al. | 348/239 |

* cited by examiner

*Primary Examiner*—Andrew W. Johns
(74) *Attorney, Agent, or Firm*—Welsh & Katz, Ltd.

(57) ABSTRACT

Conjunctival vascular images are obtained from individual's eye for purposes of creating a multi-dimension, non-iris based biometric. The biometric can be used for identification or authentication purposes. Multi-dimensional correlation processing can be used to evaluate pairs of biometrics.

35 Claims, 25 Drawing Sheets

Sclera

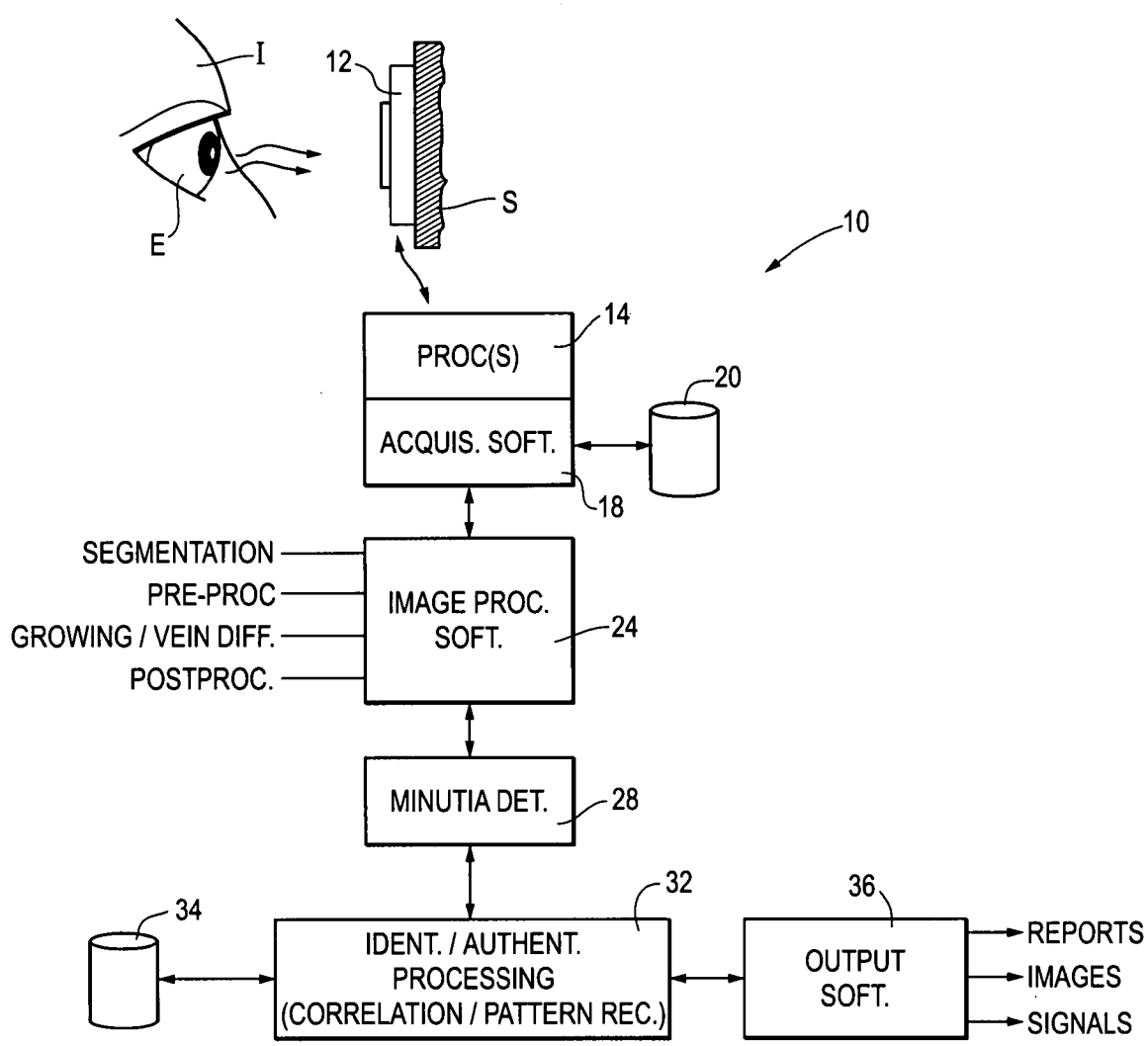

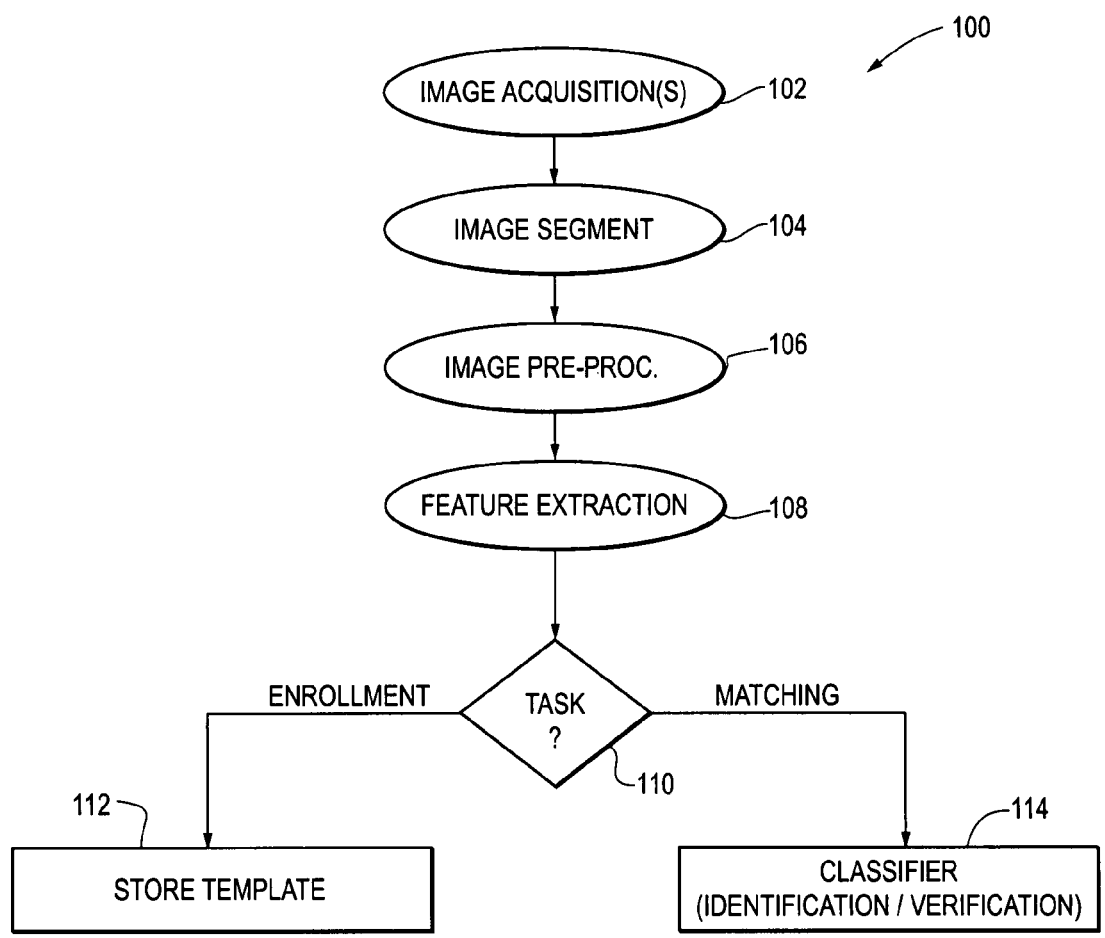

Processing sclera images

Data acquisition

Eye segmentation

Image pre-processing

Original image

Enhanced veins image

Green component

Blue component

Red component

Fig. 7F
Image pre-processing

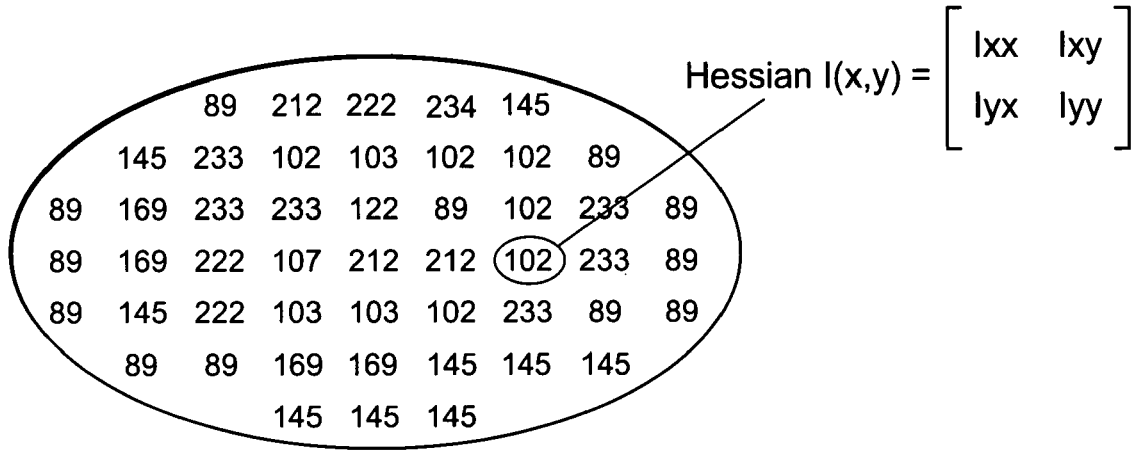

$$\text{Hessian } I(x,y) = \begin{bmatrix} Ixx & Ixy \\ Iyx & Iyy \end{bmatrix}$$

$K = (Ixx + Iyy) / 2$
$Q = sqrt (Ixx * Iyy - Ixy * Iyx)$
$\lambda 1 = K + sqrt (K^2 - Q^2)$
$\lambda 1 = K - sqrt (K^2 - Q^2)$ Ixx = second derivative on x direction
Iyy = second derivative on y direction
Ixy = second derivative on x than y direction
Iyx = second derivative on y than x direction
$\lambda 1$ and $\lambda 2$ = eigenvalues

Image pre-processing

Segmentation: Region Growing

Segmentation: Region Growing

Magnitude of the gradient of pre-processed blood vessels image is computed to determine class low gradient

Segmentation: Region Growing

First stage
planted seeds for vessels and
background region

Second stage, a = 1

Second stage, a = 2.5

Segmentation: Region Growing

End of second stage

Third stage, a = 3.5

Third stage, a = 7.5

End of third stage.
Segmented veins

Segmentation: Region Growing

Segmented veins

Prominence of the veins t-90%*t t-80%*t t-70%*t

Prominence of the veins t-60%*t t-50%*t t-40%*t t-30%*t t-20%*t t-10%*t

Otsu threshold t

Prominence of the veins t+10%*(1-t)

t+20%*(1-t)

t+30%*(1-t)

t+40%*(1-t)

t+50%*(1-t)

t+60%*(1-t)

t+70%*(1-t)

t+80%*(1-t)

t+90%*(1-t)

Prominent and less prominent veins

Image post-processing
Segmented thinned veins

Image post-processing

Validity of the segmented veins

Thinned veins overlapped over the original green component image

Minutiae detection

Minutiae detection
Detected minutiae
for veins

Fig. 11A  Matching: simple 2D correlation, 100% session 1 vs. session 2 correct matching

| 2DCorr | S2E1 | S2E2 | S2E3 | S2E4 | S2E5 | S2E6 | S2E7 | S2E8 | S2E9 | S2E10 | S2E11 | S2E12 |
|---|---|---|---|---|---|---|---|---|---|---|---|---|
| S1E1 | 0.674508 | -0.02912 | -0.01124 | 0.074483 | -0.00213 | 0.056985 | -0.03241 | 0.154106 | 0.03196 | 0.05123 | 0.020317 | 0.220072 |
| S1E2 | 0.001804 | 0.575128 | -0.01282 | -0.01964 | -0.0571 | 0.041414 | 0.084308 | -0.0369 | -0.01199 | -0.00323 | 0.24104 | 0.003041 |
| S1E3 | 0.016497 | 0.027287 | 0.421785 | -0.11506 | -0.01011 | -0.00089 | 0.066891 | 0.044574 | -0.00895 | 0.035124 | 0.040037 | 0.015806 |
| S1E4 | 0.115906 | -0.05982 | -0.12051 | 0.911304 | 0.07619 | -0.00297 | 0.016755 | 0.146153 | 0.032321 | -0.02821 | -0.00963 | 0.072706 |
| S1E5 | -0.0675 | -0.06988 | 0.028439 | 0.043394 | 0.462101 | -0.04734 | 0.057764 | 0.031931 | 0.012128 | 0.046171 | -0.02326 | -0.06541 |
| S1E6 | 0.086266 | 0.0515 | -0.06869 | 0.0794 | -0.03962 | -0.095694 | -0.0728 | 0.127124 | 0.001701 | 0.051263 | -0.02195 | 0.1946 |
| S1E7 | -0.06368 | 0.078507 | 0.074284 | -0.00868 | 0.068634 | -0.09815 | 0.646676 | -0.05995 | -0.03092 | 0.004219 | 0.083565 | -0.06154 |
| S1E8 | 0.065222 | -0.01661 | 0.032033 | 0.072044 | 0.019824 | 0.043992 | 0.000601 | 0.265475 | 0.063306 | 0.010331 | 0.044556 | 0.169412 |
| S1E9 | 0.049584 | 0.039121 | 0.048933 | 0.031722 | 0.005859 | 0.00872 | -0.0268 | 0.060851 | 0.830815 | 0.00387 | 0.164165 | 0.100345 |
| S1E10 | 0.041895 | -0.01405 | 0.009229 | -0.03741 | 0.011625 | 0.108667 | 0.007079 | 0.051902 | -0.00199 | 0.671689 | 0.007437 | 0.00719 |
| S1E11 | 0.043061 | 0.28768 | 0.111232 | -0.01355 | -0.00466 | -0.07355 | 0.096433 | -0.00743 | 0.137336 | 0.024994 | 0.822807 | -0.01436 |
| S1E12 | 0.266844 | -0.03075 | -0.00428 | 0.052083 | -0.02323 | 0.178026 | -0.09921 | 0.248726 | 0.112119 | 0.019079 | -0.04875 | 0.732497 |

Right: Gray level depiction of the above matrix

US 7,327,860 B2

CONJUNCTIVAL SCANS FOR PERSONAL IDENTIFICATION

CROSS REFERENCE TO RELATED APPLICATIONS

This application claims the benefit of the filing date of Provisional U.S. Application Ser. No. 60/677,723, filed May 4, 2005, and entitled "Conjunctival Scans for Personal Identification", incorporated herein by reference.

FIELD OF THE INVENTION

The present invention relates to methods and apparatus for identification of physical characteristics of an individual. More specifically, the invention relates to the recognition of the physical characteristics of veins of the sclera of the human eye which are visible through the conjunctival membrane.

BACKGROUND OF THE INVENTION

Iris based identification systems and related biometrics for identification and/or verification of human beings are known. Generally known systems employ image signals of an iris taken from an eye of a person. The acquired image can be compared with corresponding iris or retinal information stored in a database. However, known iris identification systems have limitations, especially, when image quality is low, or in distinguishing whether the iris observed is artificial or real.

There continues to be a need for improved ocular based identification methods which can function as stand-alone biometrics or which could be used in conjunction with existing ocular-based biometrics to achieve enhanced performance and enhanced spoofproofing.

SUMMARY

A method in accordance with the invention includes acquiring at least one image of vascular structures of an individual's eyeball. Selected vascular structures of the image can be enhanced. Vascular features can be extracted. At least one of an enrolling function; an authentication function or an identification function can then be carried out.

BRIEF DESCRIPTION OF THE DRAWINGS

FIG. 2 is a block diagram of a system in accordance with the invention;

FIG. 3 is a flow diagram of one method of processing in accordance with the invention;

FIGS. 7A-7J taken together illustrate various details of image enhancement and results thereof in accordance with the invention;

FIGS. 8M-8FF taken together illustrate processing details and results of adjusting pixel values to enhance prominence of veins;

FIGS. 11A-11B illustrate results of correlation processing of members of an exemplary database.

DETAILED DESCRIPTION OF THE EMBODIMENTS

Figure 1:
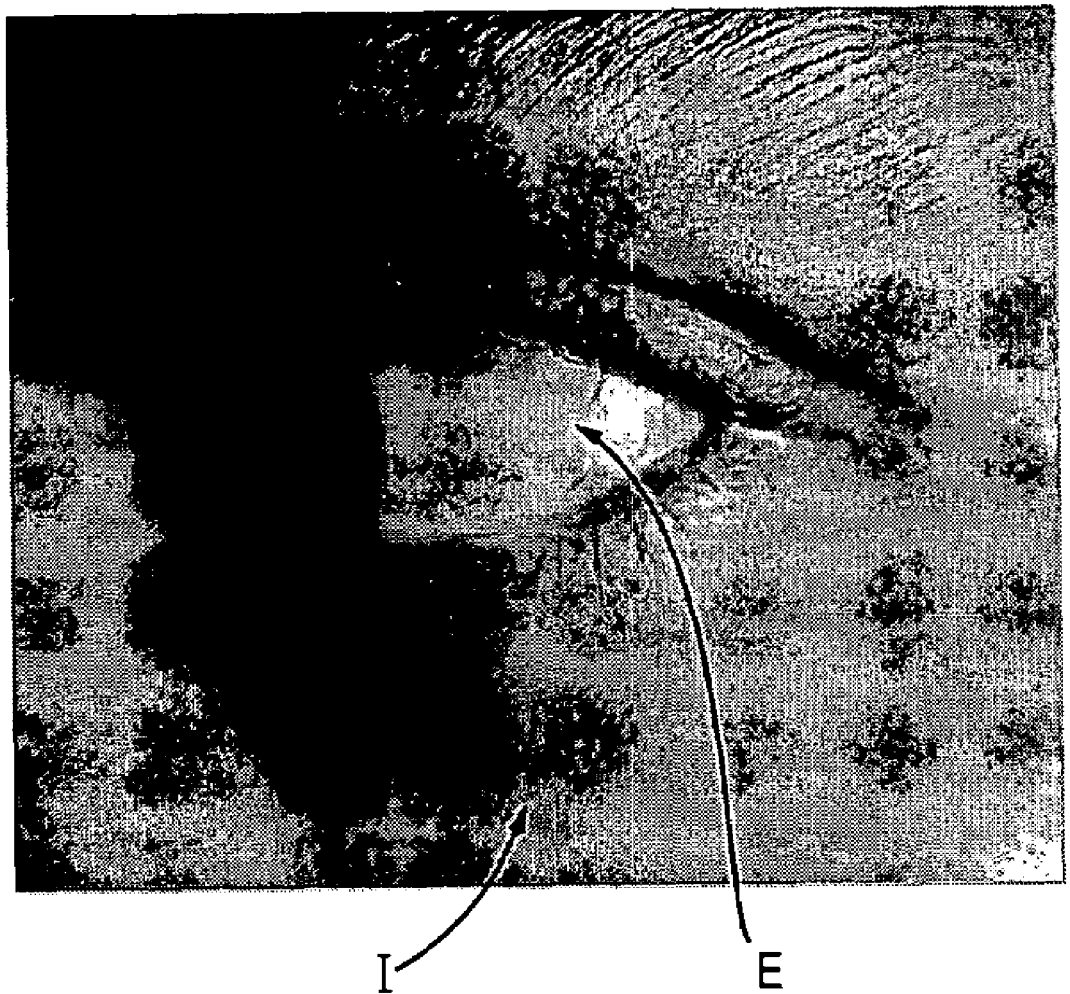
FIG. 1 is a diagram illustrating various pertinent aspects of the anatomy of the human eye.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Embodiments of the present invention can authenticate the identity of an individual using vascular identification. In one aspect, the vasculature patterns of the eye, especially the eyeball, of a human being, can be sensed and used for identification.

The vascular structures of the conjunctiva and episclera are rich with specific details. The detailed images of a registrant's eyeball can be captured and processed to extract information related to the composite patterns of conjunctival and episclera vasculature. The processed information can be stored for later identification or verification purposes. Unlike retinal scans, the vascular structures of the conjunctiva and episclera provide extensive and unique information that can be obtained from various regions of the eye and processed to authenticate or identify individuals. For example images can be obtained from either or both eyeballs of an individual. The pupil of the eye(s) can be rolled to the inner or outer edge of the eye as well as up or down exposing different scannable vascular structures.

In one embodiment, a method for confirming the identity of a person includes 1) storing image information of at least a portion of the conjunctiva of the person's eyeball; 2) illuminating an eye of an unidentified person; 3) obtaining at least one image of at least the same portion of the eyeball of the unidentified person; and 4) comparing the obtained image with the stored image information to identify the unidentified person.

Scans in accordance with the invention, include without limitation images that include vascular structures of the conjunctiva of the eyeball, of the sclera as well as the episclera alone or in combination. Thus, vascular structures capturable by imaging an individual's eyeball(s), exclusive of the iris and retina, can be used to form vascular biometrics in accordance with the invention.

Comparisons can be made between the obtained image and the stored image of the person to be identified (one-to-one matching), or between the obtained image and a specified database of stored images (one-to-many matching).

In a disclosed embodiment, composite vascular patterns can be captured using one or more digital imaging devices or cameras. The captured patterns can be enhanced by a sequence of software based processing steps to form a vascular biometric. Correlation processing or pattern recognition can be used to carry out identification or verification.

In accordance with another embodiment, a system for confirming the identity of a person through vascular scans includes an imaging unit for illuminating an eye, and for obtaining an image of the conjunctiva of the eyeball, a device for storing image information of the conjunctiva of the eye, and a processing unit for comparing the obtained image with stored image information to make an identification. In addition, the system may further include software for processing the obtained image to enhance the vessels or segments thereof.

In another aspect of the present invention, more reliable identification can be obtained by fusing the present method with existing ocular-based identification methods which use iris or retinal scans.

In yet another aspect, successful spoof attacks can be minimized through verification of transition times between different conjunctival poses. For example, in a case of multiple conjunctival captures, the nominal transition times of a registrant's eye between the consecutive eye poses can be stored with a vascular template to facilitate spoof detection.

The eye transition signature capability can also enable the registrant to store a "distress signaling" eye maneuver along with the stored image. The system can then detect a forced access situation.

In a further aspect of the invention, software can be provided for storing image information of at least a portion of an individual's optical vein stricture, visible through an anterior portion of the conjunctive membrane of the individual's eye. Additional software can be used for carrying out enhancement and related processing of the acquired image or images. Further, software can be used for correlating the acquired image or images with a database of stored images for purposes of identifying an individual. Alternately, the image or images can be used for verification of the identity of a particular individual.

In yet another aspect of the invention, one or more images of an individual's or a registrant's eye can be captured. Pre-processing including registration and segmentation of each image with respect to the eye's landmarks can be implemented. Subsequently, the vascular structures can be extracted and a processed representation or template of features thereof can be stored.

In the case of multiple conjunctival captures, nominal transition time or times of the registrant's eye between consecutive eye poses can also be stored with the template to facilitate spoof detection. The eye transition signature capability will enable the registrant to store a "distress signaling" eye maneuver with his or her template so as to be able to communicate a forced access situation.

Verification can be carried out by correlating an individual's captured template with his or her previously stored template. Alternately, correlation processing can be carried out with the acquired template relative to a database of previously acquired templates for identification purposes. Image acquisition and processing can be carried out with respect to one or both eyes of the person.

In yet another aspect of the invention, where a fusion of vascular scans with other ocular based biometrics such as iris scans is desired, the conjunctival and iris scans can be obtained simultaneously. The sets of images can be processed separately as appropriate and then fused for subsequent identification or verification purposes.

In yet another aspect of the invention, by introducing extra capture areas of the conjunctiva of the eyeball, along with the iris for a multimodal system, the threat of spoof attacks can be reduced. In such systems the attacker will have to reproduce not only the iris but also different registered regions of the conjunctiva in the sequence that the identification system requires. Such sequencing could be established on a random basis. The addition of measured and pre-stored transition times between different conjunctival poses can further impede spoof attacks.

In yet another embodiment of the invention, the green component of a red, blue, green conjunctival image can be extracted and processed as the green layer provides enhanced contrast of the vasculature. A gray scale image of the green layer can be enhanced by use of an adaptive histogram contrast equalization technique to yield a pilot template. Two dimensional correlation processing can be used to match a current captured image or images with one or more of a plurality of prestored conjunctival templates. Pairs exhibiting the highest correlation can be used to indicate a match.

FIG. 1 illustrates various aspects of an eye E of an individual I. The eye E can be scanned and the results thereof analyzed in accordance with the present invention, as discussed in more detail subsequently.

As those of skill in the art understand, the eye E includes a fibrous outer protective coating, the sclera. The sclera is a dense and firm membrane comprised of white and opaque fibrin connective tissue organized in many bands of parallel and interlacing fibrous tissue bundles, each of which is 10-16 μm thick and 100-140 μm wide. The sclera has a thin layer on the outer surface called the episclera. The episclera is fine elastic tissue that contains blood vessels that nourish the sclera. The anterior part of the episclera is covered by a conjunctival membrane. The conjunctival membrane is a thin exterior membrane which assists in lubrication of the eye E when the Individual I is blinking or closing his or her eye.

The sclera incorporates and displays a complex vascular structure which is not only readily visible and scannable from outside of the eye E but in addition that vascular structure is unique and varies between individuals. Thus, as explained below, the vascular structures of the sclera, visible through the conjunctival membrane, can be scanned and advantageously used as a multi-dimensional, non-iris-based biometric. The biometric can be used to either authentify a particular individual, or, identify an unknown individual.

FIG. 2 is a block diagram of a system 10 in accordance with the invention. The above noted vascular structure of the individuals eye E can be scanned using any one of a number of commercially available imaging devices 12. Singular or multiple imaging devices 12 can be used to scan both of the individual's eyes either sequentially or simultaneously.

The scanners 12 can be affixed to a surface S. In such configuration, one or two scanners 12 could be used with limitation. The nature and detailed characteristics of the scanner(s) 12 are not limitations of the present invention.

As illustrated in FIG. 1, movement of the eye E presents different scannable vascular images. Images can include having the individual position the pupil to various locations to provide for left, right, roll up, roll up-left, and roll up-right eye captures or scans. The above described scans are in addition to scans which in the past have been taken of the iris of an individual's eye. Iris based, imaging and analysis can be used as a second or additional biometric which can be combined with the present vascular biometric to increase the reliability of an identification or authentication function.

The system 10 of FIG. 2 can also incorporate one or more programmable processors 14 which could be displaced from one another and communicate via one or more computer based networks without limitation. Processors 14 receive image data from scanner 12 in the form of pixels, the characteristics of which are dependent upon the particular imaging device 12 being used. Such variations come within the spirit and scope of the present invention.

The processor or processors 14 can execute preloaded acquisition software 18 to facilitate obtaining the imaging data from the imaging device 12. The digitized pixels received from the imaging device 12 can be stored locally, data base 20, relative to one or more of the processors 14 prior to carry out image processing. Alternately, the imaging data can be transmitted via a computer network or networks to a displaced processor for further analysis.

Image processing software 24 can access the prestored imaging data 20 to carry out a variety of different functions. Representative functions can include, segmenting the images, preprocessing the images, which can produce enhanced images of use in further processing. Image processing software 24 can also include segmentation processing of emphasized vessels as well as determining prominent and less prominent veins as discussed subsequently. Image post processing can include smoothing and thinning veins to facilitate subsequent processing.

Minutiae detection software 28 can further process the image data received from the image processing software 24 to produce data templates which can be stored, for building a database 34, or, used in carrying out identification or authentification processing via software 32. Output software 36 can provide a plurality of reports, images as well as signals for transmission to displaced output devices.

Those of skill will understand that the software elements 24-36 can be local or displaced relative to one another all without limitation. Communications between modules can be carried out via computer networks as is convenient for the user or operator.

FIG. 3 is a flow diagram of a method 100 which could be implemented by the system 10 of FIG. 2, in accordance with the invention. In a step 102 a variety of conjunctival vascular images can be obtained using one or more of the imaging devices 12 as discussed previously. The images can be segmented in a step 104.

Image preprocessing can be carried out in a step 106. Finally, in a step 108 appropriate features can be extracted from the processed imagery, for example, by the minutiae detection software 28.

As illustrated in FIG. 3, in a step 110 a decision is made as to type of function, such as enrollment or matching. Where an enrollment function is being implemented, the processed imagery, which might be in the form of a template usable for comparison or correlation processing, can be stored in the database 34 along with the previously obtained vascular samples.

In the event that identification or verification process 114 is being undertaken, the current imaging data, can be compared to or correlated with corresponding imaging data from a particular individual for purposes of carrying out an authentification process. Alternately, the current data can be compared sequentially to data records prestored in database 34 to carry out an identification function.

Figure 4A:
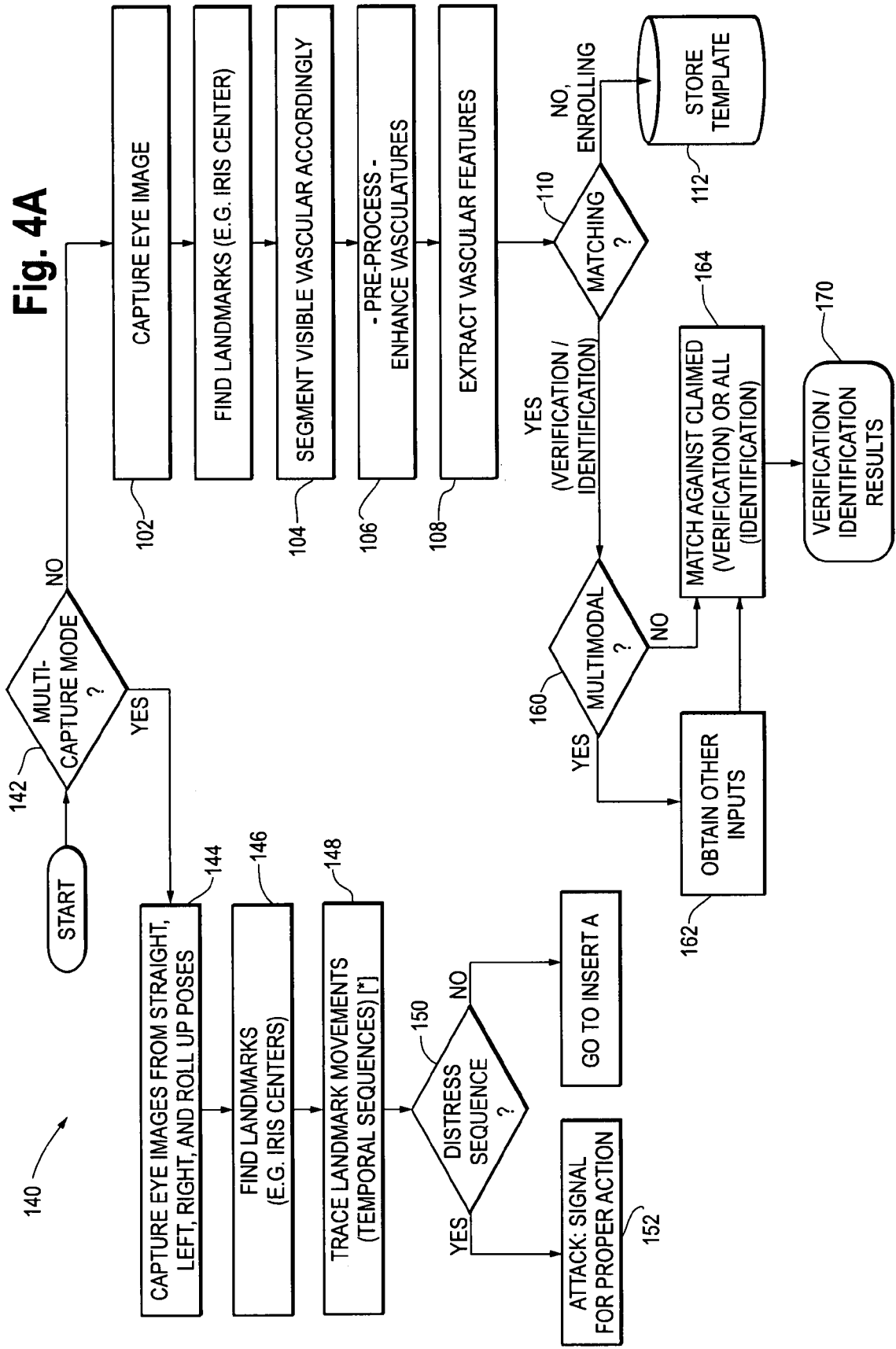
FIGS. 4A and 4B taken together are a flow diagram of another method of processing in accordance with the invention.
Figure 4B:
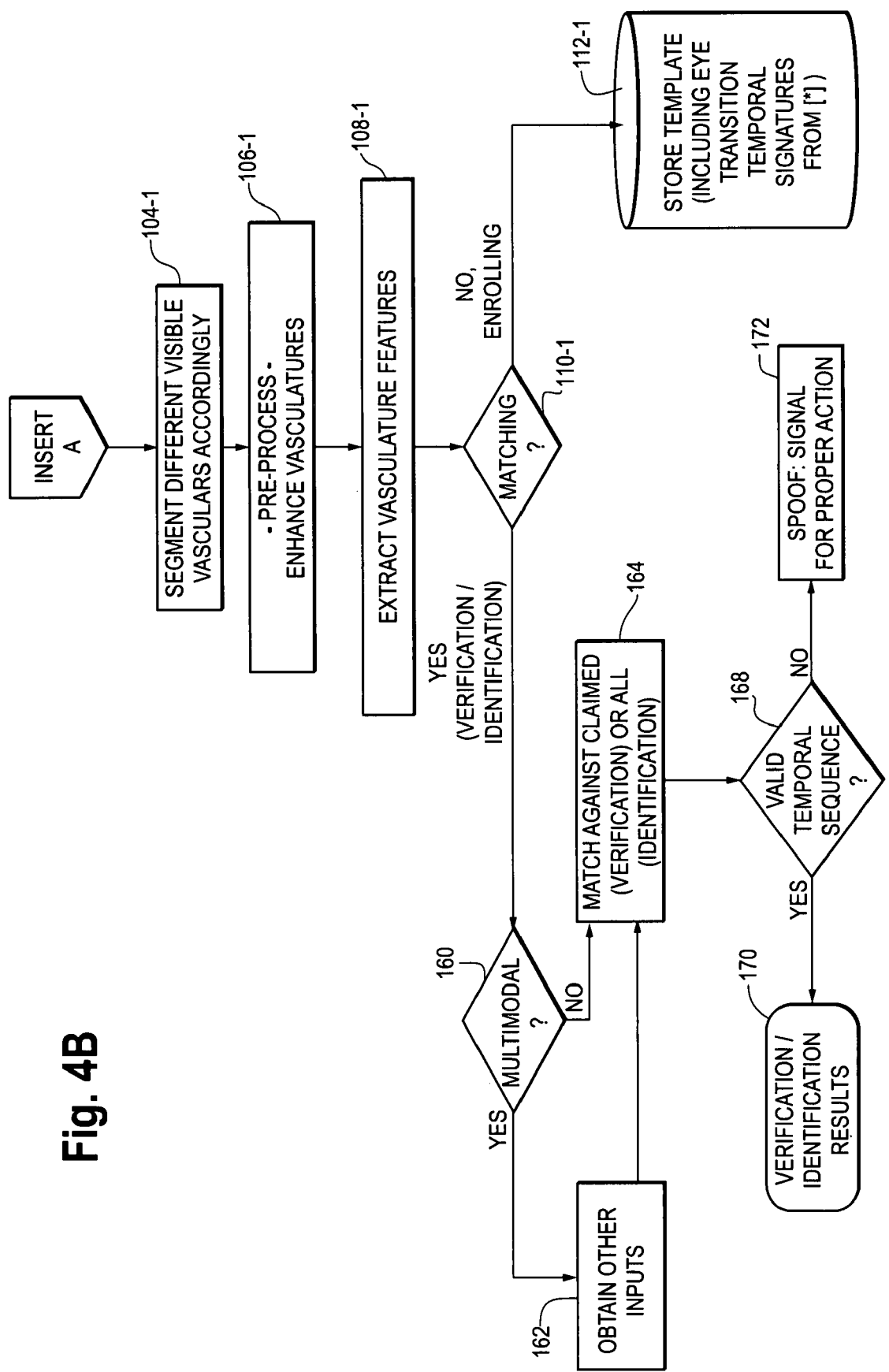

FIGS. 4A and 4B taken together illustrate a method 140 which includes additional details of vascular scanning and processing in accordance with the invention. The processing steps of FIG. 4A, 4B, that correspond to the processing steps of the method 100 have been given the same or corresponding types of identification numerals.

As illustrated in FIGS. 4A, 4B, an evaluation is made step 142 as to the image capture mode. Where a multi-capture mode has been selected, the images are captured from a variety of poses, step 144. Appropriate landmarks can be located for the images, step 146.

As an additional security feature landmark movements, that is to say for example movements of the individual's iris, can be tracked and acquired in step 148. The temporal sequences so acquired can be evaluated and compared to one or more prestored distress sequences step 150. An appropriate response can be taken, step 152 in the event that a distress sequence is detected. If not, relative to FIG. 4B, the different visible scanned regions of the vascular structures can be segmented step 104-1.

In step 106-1 the scanned images can be pre-processed for purposes of enhancing portions thereof. The vascular features can be extracted in step 108-1.

Where a matching function is to be undertaken, step 110-1, the number of modes to be used is established, step 160. If multi-mobile biometric comparisons are to be carried out, the other inputs are obtained, step 162.

In step 164, for authentication or verification, the appropriate biometrics are compared to or correlated with a prestored biometric associated with a designated individual. Alternately for identification purposes, the present biometric or biometrics are matched against the members of the database 34.

In step 168 a determination can be made relative to the respective current biometric or biometrics has to whether or not a valid temporal sequence was previously detected, step 148. If so the results of the verification/identification processing can be provided, step 170 by the output software 36. Alternately, one or more indicia (such as displayed images, alarm indicating signals or the like) can be provided, step 172 indicating that the temporal sequence of the landmark movements is not valid and a spoof attack may have been detected.

Relative to FIG. 4A, where the matching step 110 indicates that a verification or identification process is to be carried out, the previously discussed steps 160, 162, 164 and 170 can be executed.

Figure 4C:
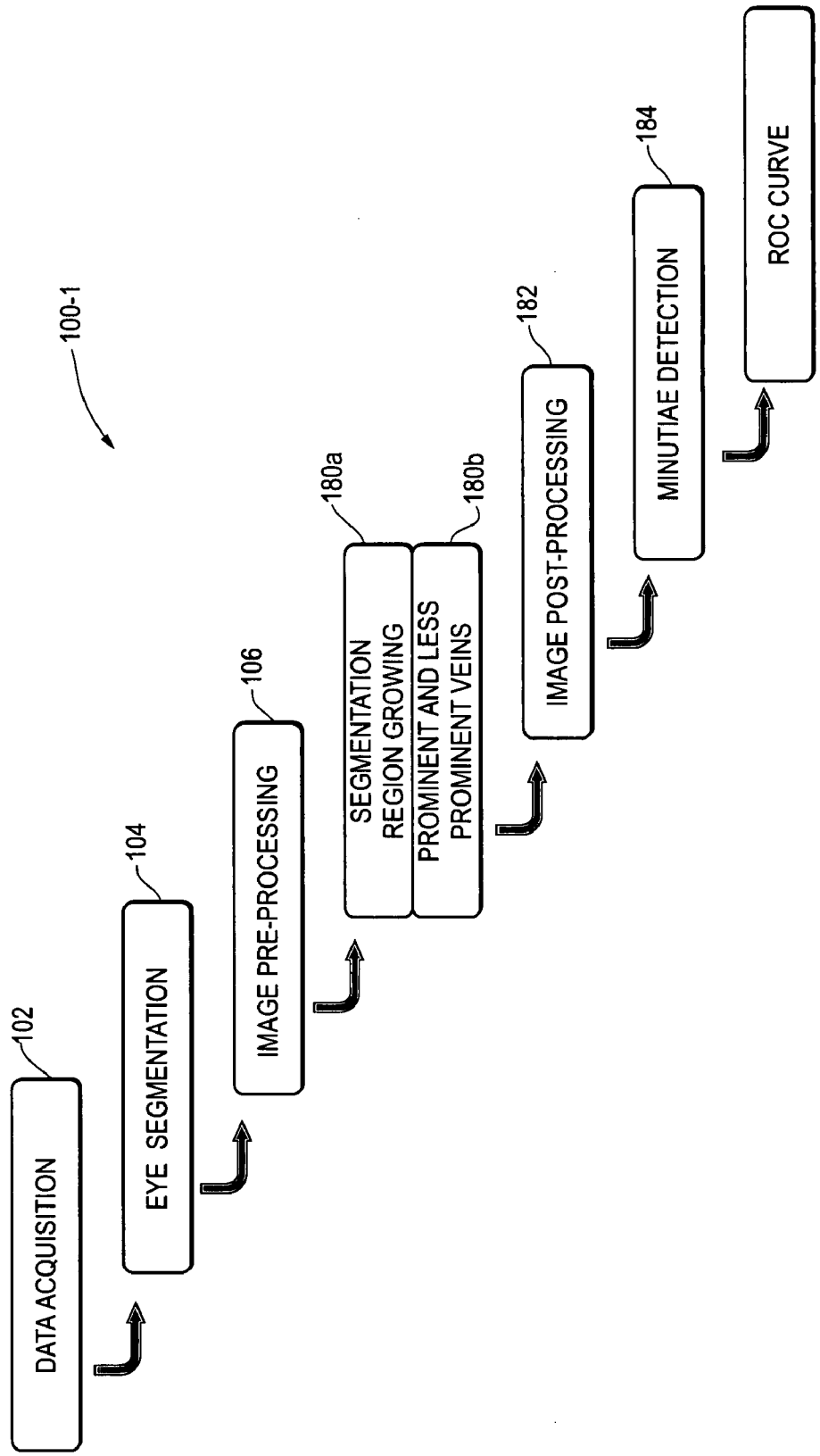
FIG. 4C is a flow diagram of yet another method of processing in accordance with the invention.

FIG. 4C illustrates various steps of a method 100-1 which provides additional processing details relative to the method 100. Those steps of the method 100-1 that correspond to the steps of the method 100 have been assigned the same identification numerals.

Figure 5:
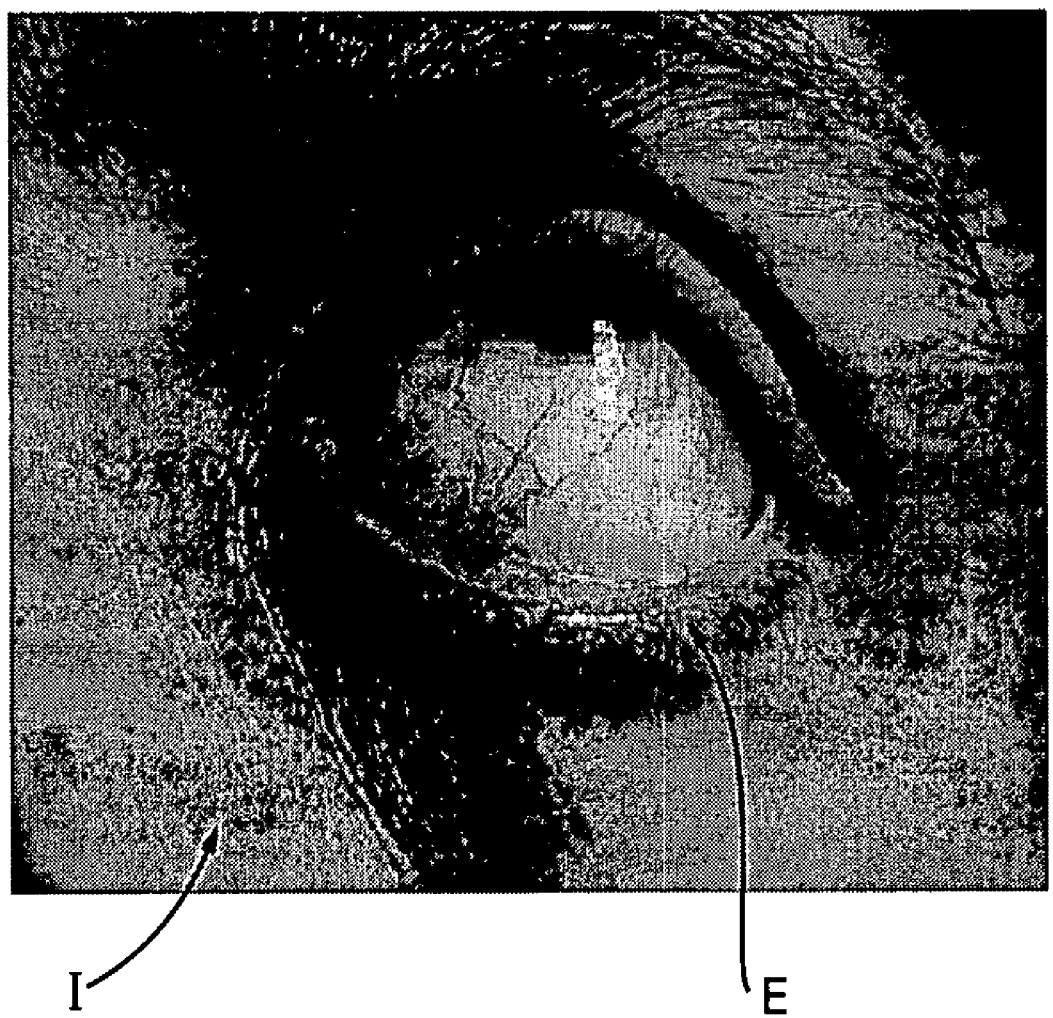
FIG. 5 illustrates aspects of obtaining images of vascular structures in accordance with the invention.

FIG. 5 provides a view of the eye E relative to the image or data acquisition step 102 by the imaging device(s) or camera 12. One particular form of an imaging device, is the commercially available digital camera, Sony Cyber-shot F717 5.0 Megapixels. That exemplary device could be used to obtain images from both eyes as well as multiple images for each individual eye at a picture size of 2560 by 1920.

Figure 6A:
FIGS. 6A-6C illustrates various aspects of segmenting images of a type illustrated in FIG. 5.
Figure 6B:
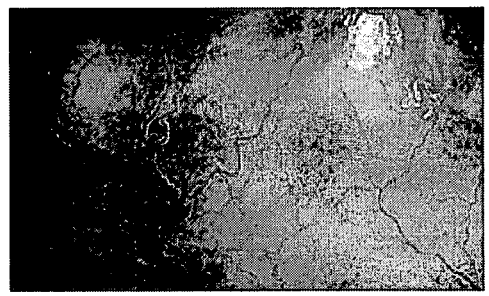
Figure 6C:

FIGS. 6A-6C illustrates details of the image segmentation step 104. Images of various sizes can be provided and/or cropped for subsequent processing including but not limited to 818×460, 624×527 and 435×201. Large variations exist in intensity values of the vascular structures present in each of the different images. Additionally, there is a low contrast between vessels and the background of each image.

Figure 7A:
Figure 7B:
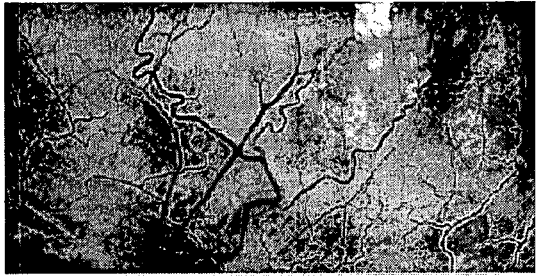
Figure 7C:
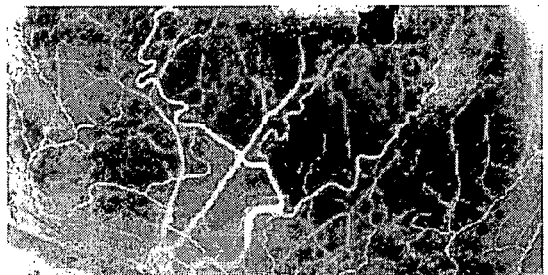
Figure 7D:
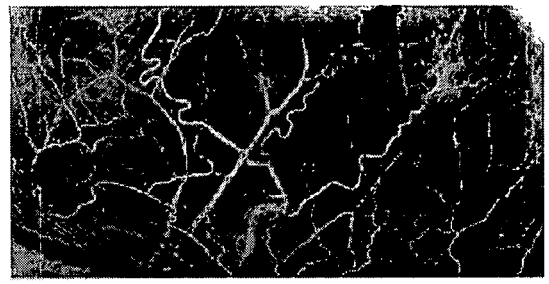
Figure 7E:
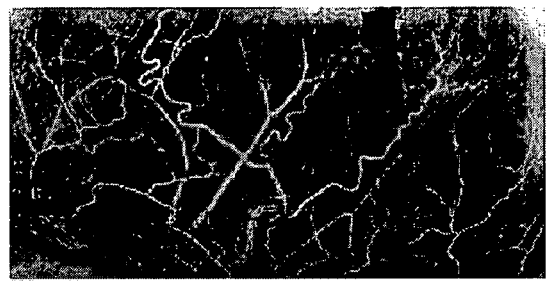
Figure 7G:
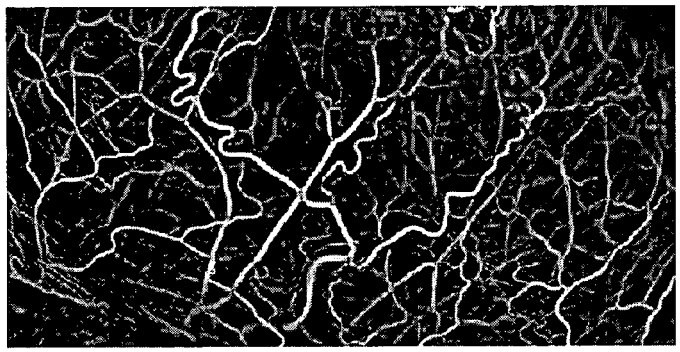
Figure 7H:
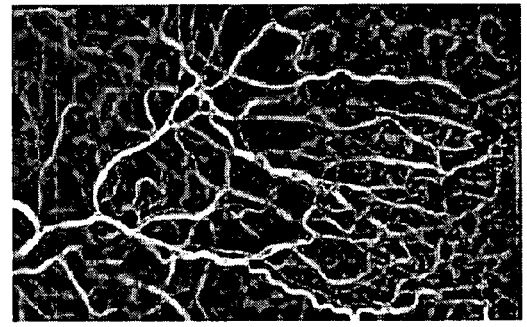
Figure 7I:
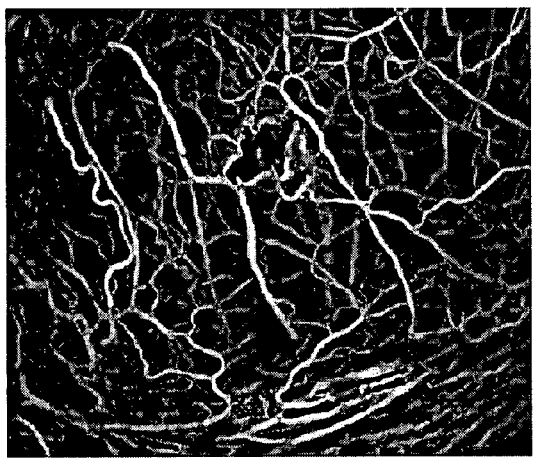
Figure 7J:
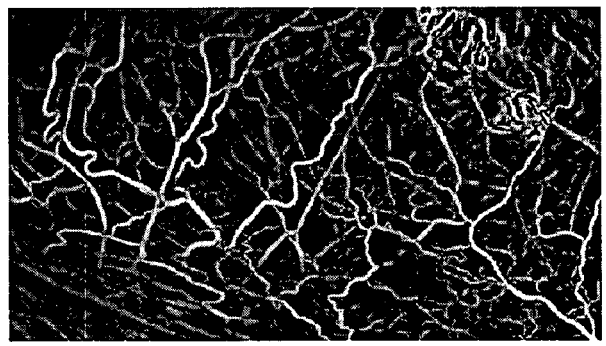

FIGS. 7A-7J illustrate details of preprocessing step 106 for purposes of image enhancement. Image enhancement is carried out through Color Image Enhancement and Contrast-Limited Adaptive Histogram Equalization (CLAHE) which enhances the contrast of the intensity image. CLAHE operates in small regions of the image called tiles. Each tile's contrast is enhanced such that the histogram of the output approximately matches the histogram specified by uniform distribution. The neighboring tiles are then combined using bilinear interpolation to eliminate the artificially induced boundaries. More particularly, the images can be enhanced by selecting one of the red, green or blue components which has the best contrast between the vessels and the background as shown in FIGS. 7C-7E. The green component is preferred because it provides the best contrast between vessels and background.

A multi-scale enhancement filtering scheme is used to enhance the intensity of the image thereby permitting the detection and subsequent extraction of the vascular structure. The parameters of the filter are determined empirically so as to account for variations in the girth of the blood vessel. The algorithm used has good sensitivity, good specificity for curves and suppresses objects of other shapes. The algorithm is based on the second derivatives of the image. First, since the second derivatives are sensitive to noise, the image is convolved with a Gaussian function. Parameter $\sigma$ of the Gaussian function represents the thickness of the blood vessel. Next, as shown in FIG. 7F, for each pixel a Hessian matrix is built and eigenvalues $\lambda_1$ and $\lambda_2$ are computed. In each Hessian matrix ridges are defined as points where the image has an extremum in the direction of the curvature. The direction of the curvature is the eigenvector of the second order derivatives of the image that corresponds to the largest absolute eigenvalue $\lambda$. The sign of the eigenvalue determines if it is a local minimum $\lambda > 0$ or maximum $\lambda < 0$. The computed eigenvalues are then used to filter the blood vessel line with the equations $I_{line}(\lambda_1, \lambda_2) = |\lambda_1| - |\lambda_2|$ if $\lambda_1 < 0$ and $I_{line}(\lambda_1, \lambda_2) = 0$ if $\lambda_1 \geq 0$. The diameter of the blood vessels varies but the algorithm assumes $[d_0, d_1]$. Therefore, Gaussian smoothing filters are employed in the scale range of $[d_0/4, d_1/4]$. This is repeated N times based on the smoothing scales: $\sigma_1 = d_0/4, \sigma_2 = r^*\sigma_1, \sigma_2 = r^2\sigma_1, \ldots \sigma_2 = r^{n-1}*\sigma_1 = d_1/4$. This final output is the maximum value from the output of all individual filters of N scales. FIGS. 7G-7J illustrate representative preprocessed vascular images.

Figure 8A:
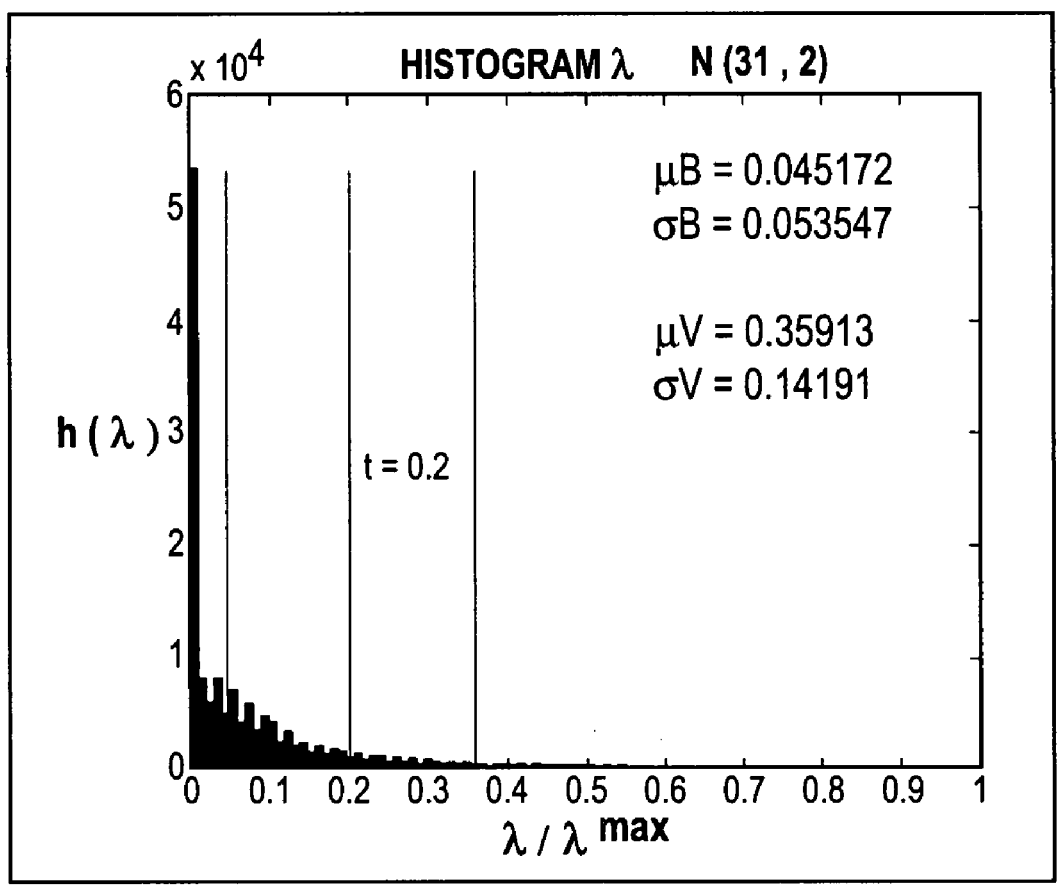
FIGS. 8A-8L taken together illustrate processing steps associated with and results of region growing in accordance with invention.
Figure 8B:
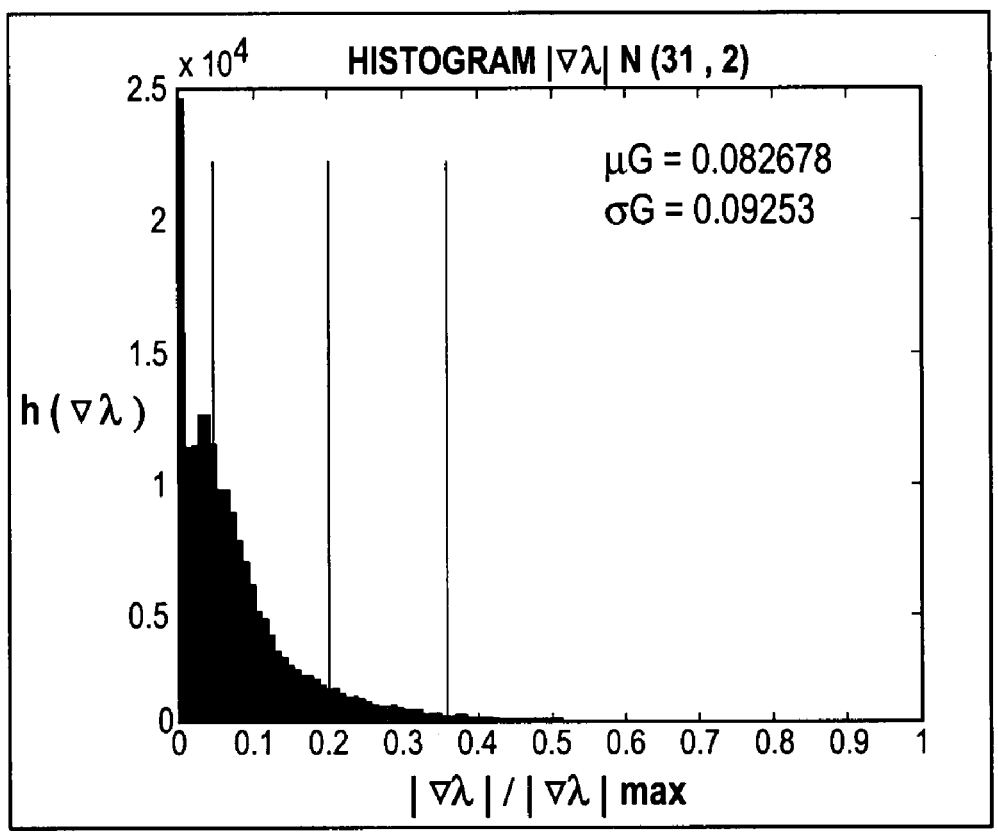
Figure 8C:
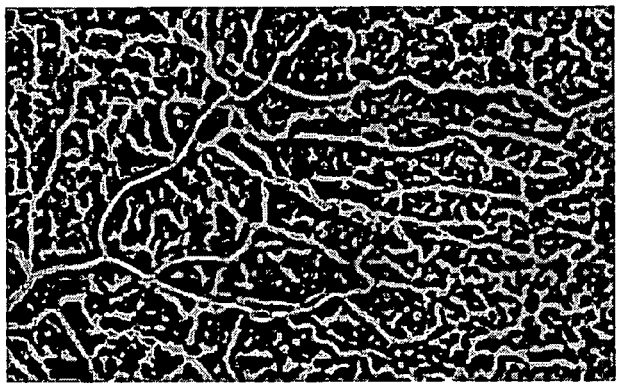
Figure 8D:
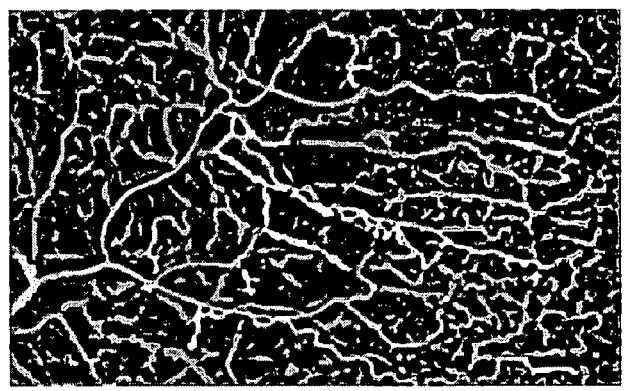
Figure 8E:
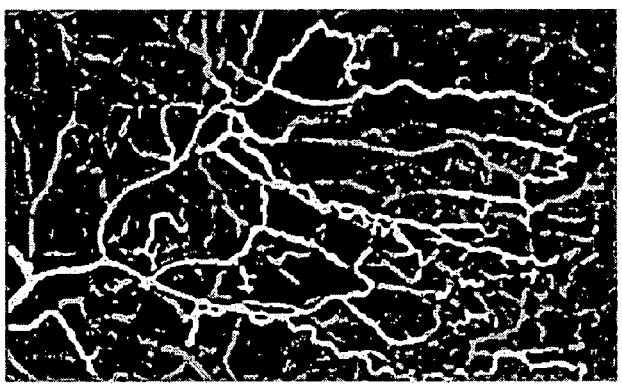
Figure 8F:
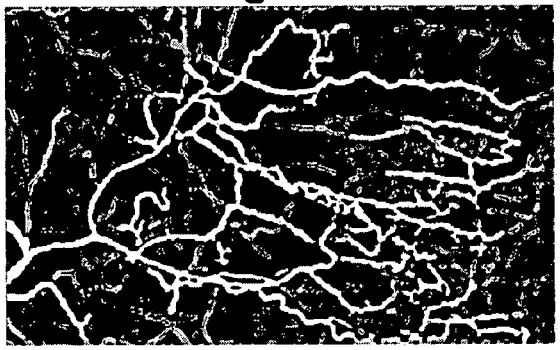
Figure 8G:
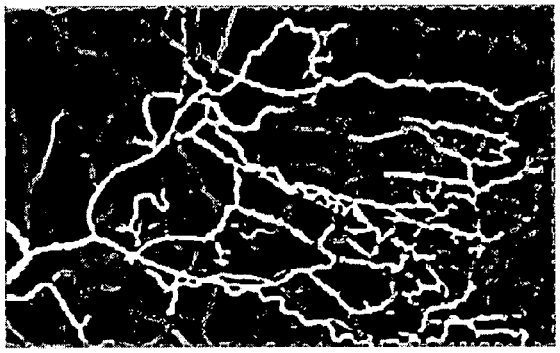
Figure 8H:
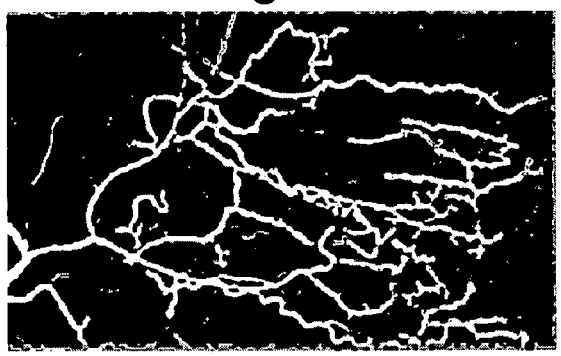
Figure 8I:

After the blood vessel images are enhanced, processing step 180a is performed which involves thresholding and region growing relative to the image. During this process, the image is divided into two regions: vessel and background. The labeling algorithm for the two regions is based on information provided by the magnitude of the gradient of the pre-processed blood vessels image obtained from histograms such as those shown in FIGS. 8A-8B. Otsu's method is used to determine the threshold value between regions. The relevant values obtained are the mean for the vessel ($\mu_v$), the standard deviation for the vessel ($\sigma_v$), the mean for the background ($\mu_B$), the standard deviation for the background ($\sigma_B$), the mean for low gradient ($\mu_G$) and the standard deviation for low gradient ($\sigma_G$).

Figure 8J:
Figure 8K:
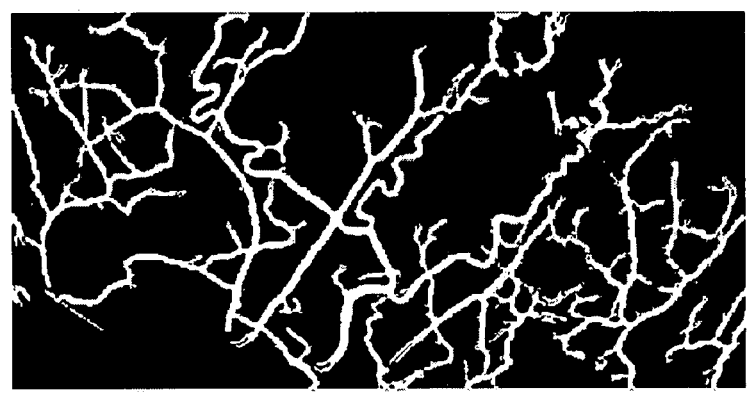
Figure 8L:
Figure 8M:
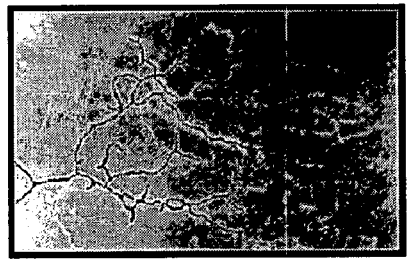
Figure 8N:
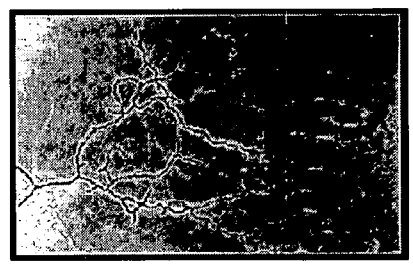
Figure 8O:
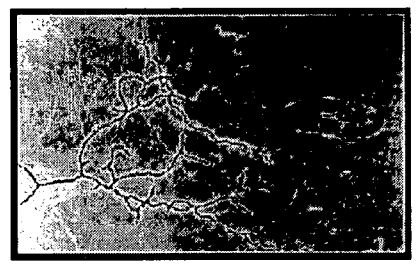
Figure 8P:
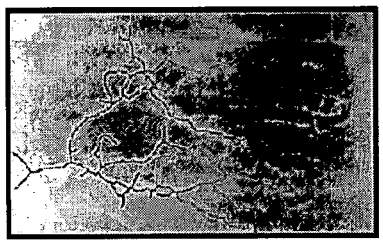
Figure 8Q:
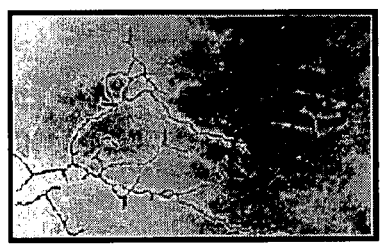
Figure 8R:
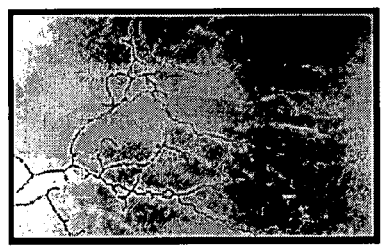
Figure 8S:
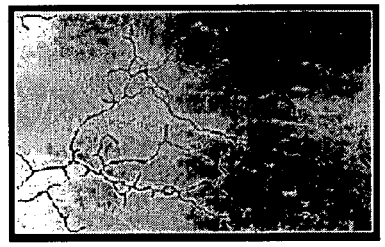
Figure 8T:
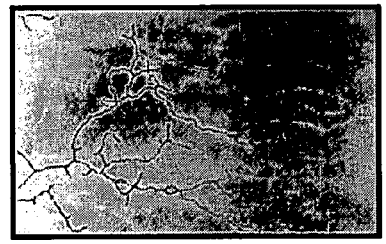
Figure 8U:
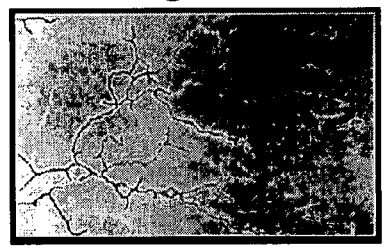
Figure 8V:
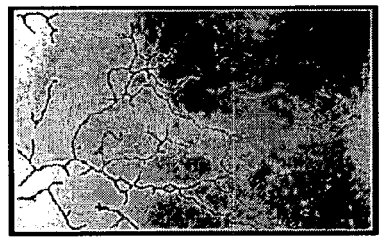
Figure 8W:
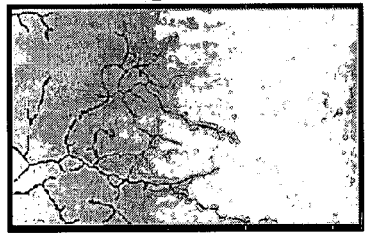
Figure 8X:
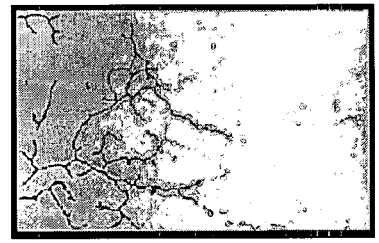
Figure 8Y:
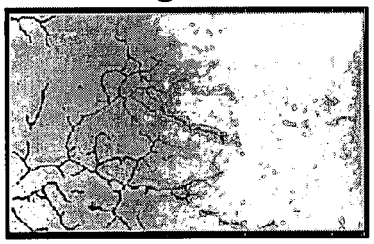
Figure 8Z:
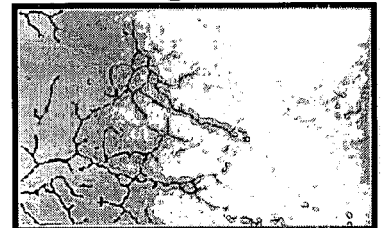
Figure 8A:
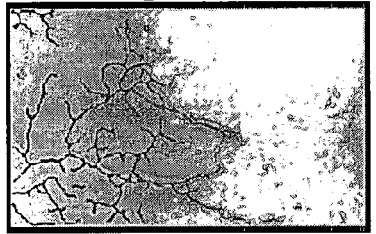
Figure 8B:
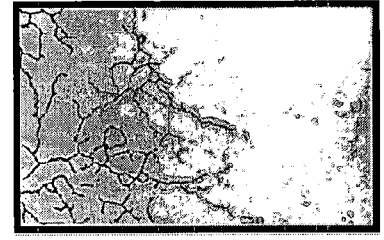
Figure 8C:
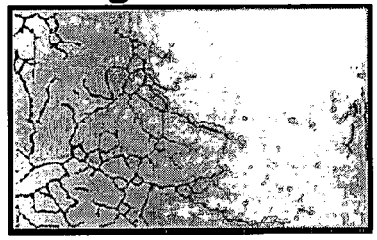
Figure 8D:
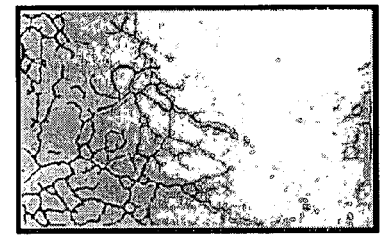
Figure 8E:
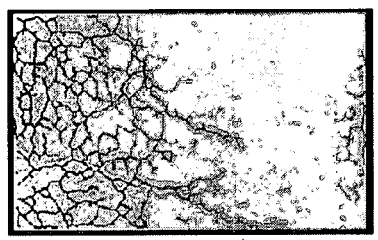
Figure 8F:
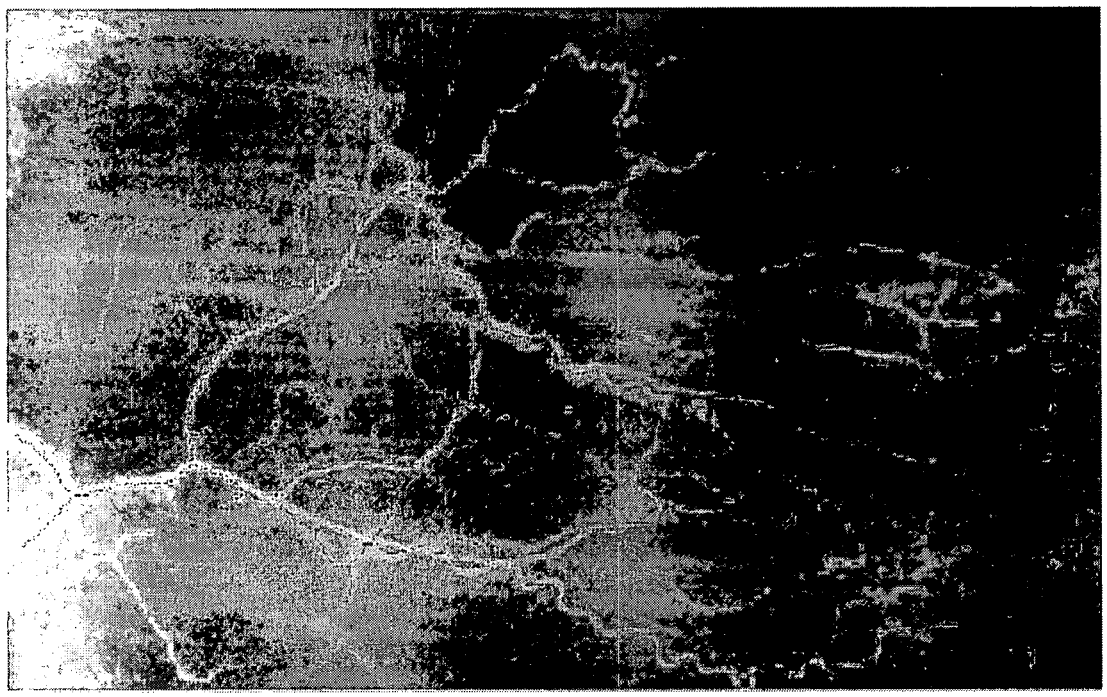
Figure 9A:
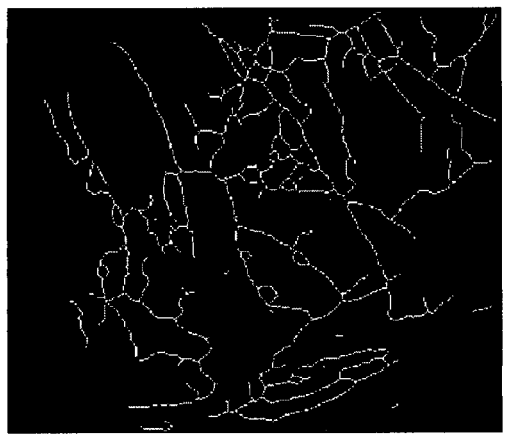
FIGS. 9A-9G taken together illustrate results of image post processing.
Figure 9B:
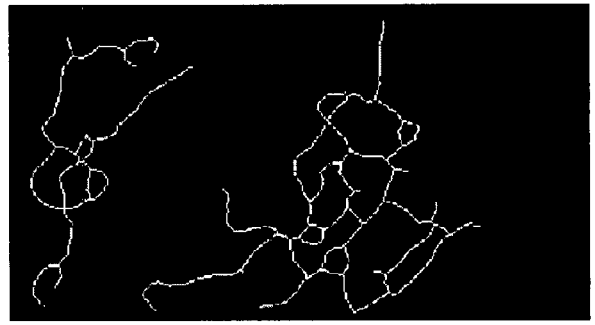
Figure 9C:
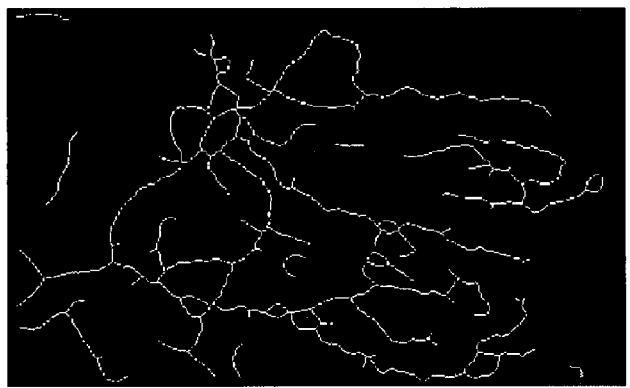
Figure 9D:
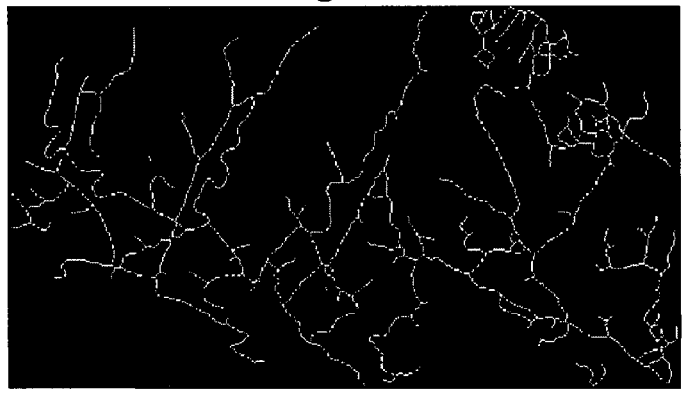
Figure 9E:
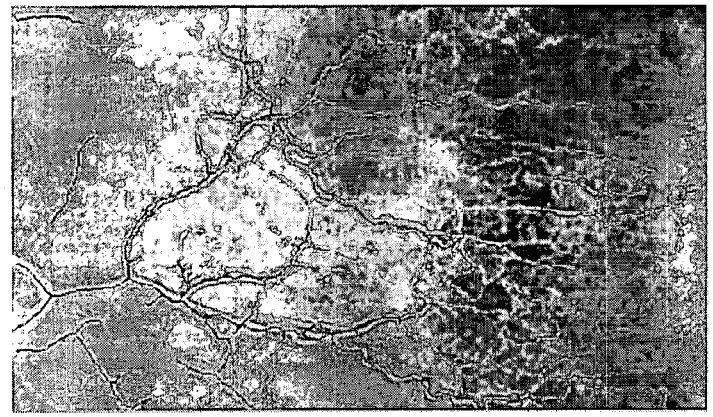
Figure 9F:
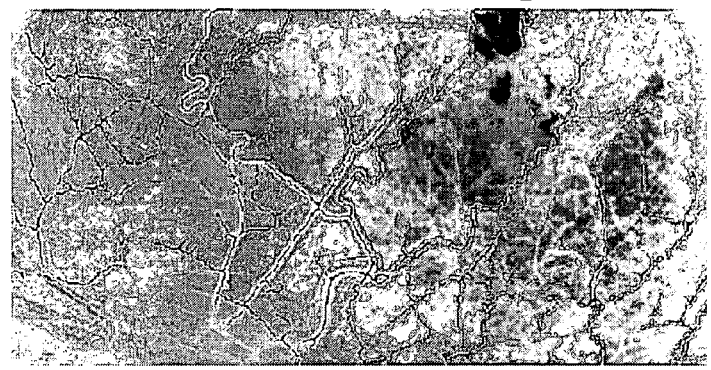
Figure 9G:
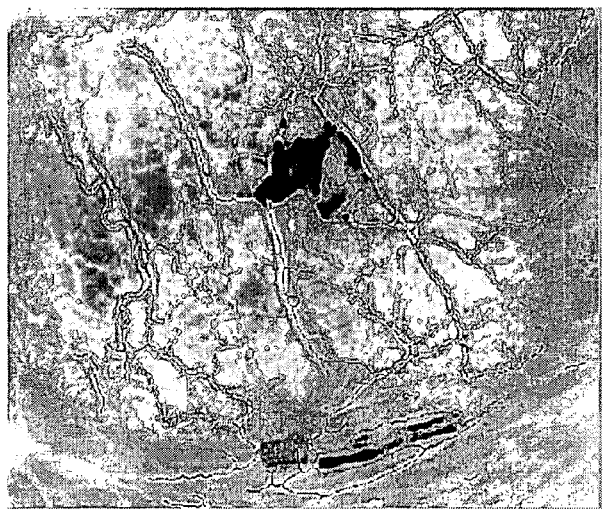
Figure 10A:
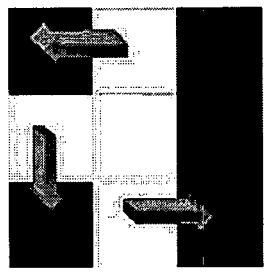
FIGS. 10A-10G illustrate processing steps and results of minutiae detection.
Figure 10B:
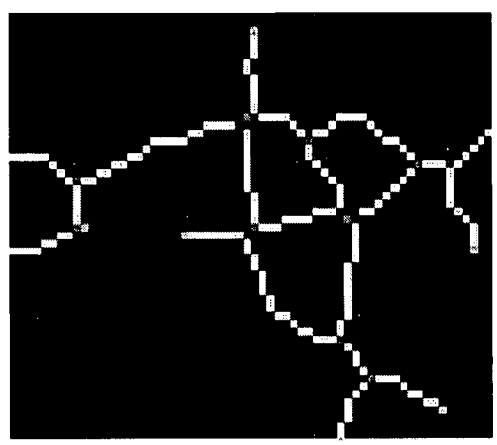
Figure 10C:
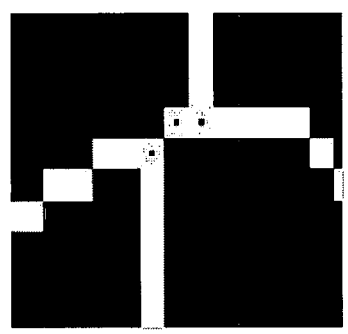
Figure 10D:
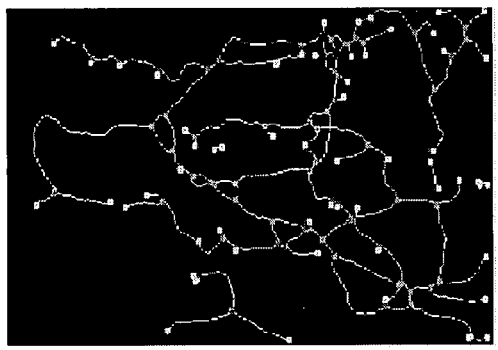
Figure 10E:
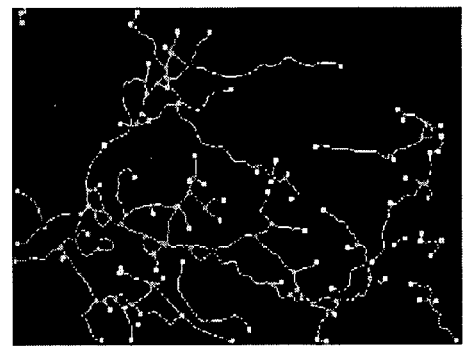
Figure 10F:
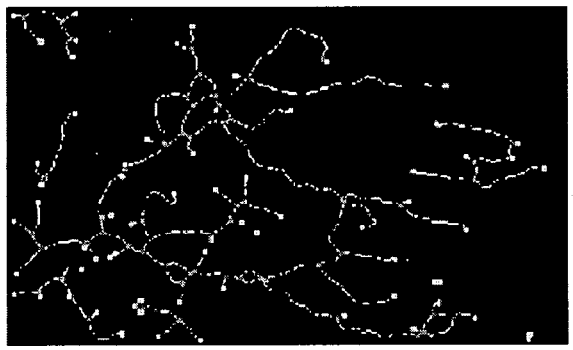
Figure 10G:
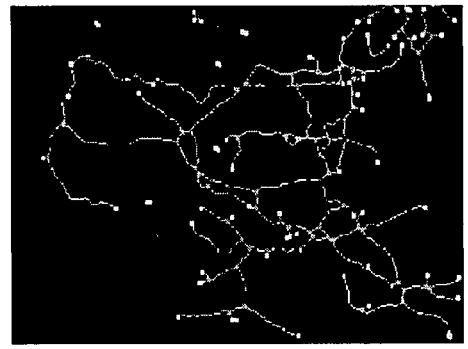

Region growing is then carried out in three stages. In the first stage, seeds for both vessel and background regions are planted. White pixels are seeds for the vessels, with $\lambda = \mu_v$. Black pixels are seeds for the background, with $\lambda = \mu_B$. Gray pixels are to be labeled as on of the two classes. In the second stage, restricted growing is carried out in low gradient regions. Pixels are labeled as vessels if the fulfill the condition: $(\mu_v - a_v^*\sigma_v) \leq \lambda$ and $|Gradient(\lambda)| \leq (\mu_G + a_G^*\sigma_G)$ and $N_v \geq 1$. Pixels are labeled as background if they fulfill the condition: $(\mu_B - a_B^*\sigma_B) \geq \lambda$ and $|Gradient(\lambda)| \leq (\lambda_G)$ and $N_B \geq 1$. The system is relaxed by incrementing the parameter $a_v$ by 0.5 each iteration and the two procedures are alternated until no more pixels are classified. In the third stage, vessels and background grow simultaneously without gradient restriction according to the following proportions: $(\mu_v - a_v^*\sigma_v) \leq \lambda \leq (\mu_v + a_v^*\sigma_v)$ and $N_v \geq 1$; $(\mu_B - a_B^*\sigma_B) \leq \lambda \leq (\mu_B + a_B^*\sigma_B)$ and $N_B \geq 1$. FIGS. 8C-8I illustrate an image at various points throughout the above outlined process. FIGS. 8J-8K illustrate the segmentation of the vessels as a result of the thresholding and region growing procedures outlined above. Details and results of the processing of step 180b focusing on prominent veins, are illustrated in steps 8M-8FF. The figures are a result of varying the Otus threshold t by 10% steps in order to elicit various level of detail of the vascular pattern. Establishment of strict thresholds would result in the segmentation of prominent veins. On the other hand, establishment of loose thresholds would result in the inclusion of noise in the segmented results.

Image post processing step 182 can be carried out through various morphological operations as illustrated in FIGS. 9A-9G. These operations include removing isolated pixels (white pixels on black background), smooting the curves by setting a pixel to 1 if five or more pixels in its 3-by-neighborhood are 1's or else setting the pixel to 0, thinning the vessels to lines and removing spur pixels. The post processing smoothes the segmented vascular patterns, removes isolated elements and, in general, improves the overall quality of the segmented images. The application of morphological operators is intended to discard the noise present in the segmented image and extract the thinned version of the vascular pattern.

Details of step 184, minutiae detection are illustrated in FIGS. 10A-10G. The minutiae points indicate pixels in the thinned image corresponding to bifurcations in the vascular pattern. Minutiae points are detected by applying the chain rule in the neighborhood of every white pixel. 3 transactions represents a bifurcation and 1 transaction represents an ending. A blue pixel is assigned where two minutiae are located in a 3×3 neighborhood indicating a bifurcation. A red pixel results from one minutiae in the 3×3 neighborhood indicating an ending. A green pixel results from two minutiae in a 3×3 neighborhood that are replaced with one minutiae. A collection of these points is used as a biometric representation. Alternately, the enhanced image described above in paragraph 64 may be used as a biometric representation. The processed biometric representations can then be stored, data base 34. Subsequently they can be used to carry out authentication, or identification functions, steps 114, 164.

Figure 11B:
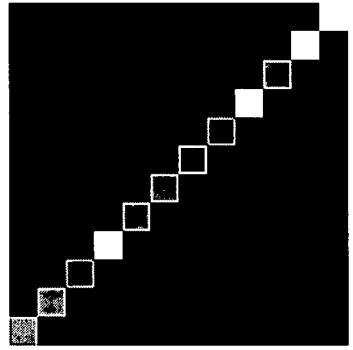

The processed vascular biometric representations can be matched with or correlated with either a corresponding biometric for a specific individual, to carry out an authentification process, or compared to or correlated with a plurality of corresponding biometrics from a variety of different individuals, for purposes of carrying out an identification process. FIGS. 11A-11B illustrates the results of correlation of processing between biometrics based on conjunctival vasculature as obtained and processed in accordance with, for example, process 100-1.

Vascular biometrics were obtained for both eyes for six different individuals. Correlations processing was then carried out between all the pairs of the images. As illustrated in FIG. 11A, the correlations between the biometrics associated with the same eyeball of a given individual were substantially higher than the results of the correlation processing of vascular biometrics from 2 different individuals.

It will be understood that the type of processing illustrated in FIGS. 11A-11B is illustrative and exemplary only. Other types of processing for example pattern recognition of various types come within the spirit and scope of the present invention.

Various configurations of system 10, FIG. 2, come within the spirit and scope of the invention. Data bases 20, 34 could be maintained in common or different storage systems. All of the components 12, 14, 18-36 of the system 10 could be displaced from one another and communicate via one or more computer networks such as the Internet without limitation. Other forms of signal processing, unlike those illustrated and described herein also come within the spirit and scope of the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

We claim:

1. A method comprising:
acquiring at least one image of a conjunctival region of an individual's eyeball;
enhancing selected vascular structures in the image;
extracting vascular features; and
carrying out at least one of an enrollment, an authentication or an identification function.

2. A method as in claim 1 where carrying out includes, for authentication, accessing a selected vascular biometric of an identified individual and correlating that biometric with a representation of the extracted vascular features.

3. A method as in claim 2 which includes evaluating the results of the correlating and determining the authenticity of the individual.

4. A method as in claim 1, wherein carrying out includes, for identification, accessing vascular biometrics of a plurality of different individuals and correlating those biometrics with a representation of the extracted vascular features.

5. A method as in claim 4 which includes evaluating the results of the correlating and determining the identity of the individual.

6. A method as in claim 1 where carrying out includes, for enrollment, storing the extracted vascular features as a conjunctive biometric associated with the individual.

7. A method as in claim 1, which includes after acquiring, selectively segmenting the acquired at least one image.

8. A method as in claim 1, where enhancing includes forming at least one color differentiated version of the at least one image.

9. A method as in claim 8 wherein forming includes processing at least a green representation of the at least one image.

10. A method as in claim 8 which includes enhancing vascular characteristics of the green representation.

11. A method as in claim 1 which includes acquiring a plurality images of vascular regions of the individual's eye.

12. A method as in claim 11 which includes acquiring selected eye movement sequences of the individual's eyeball.

13. A method as in claim 12 which includes evaluating at least some of the sequences for the presence of a pre-established alarm indicating pattern.

14. A method as in claim 13 wherein in the absence of the alarm indicating pattern, at least one image is selectively segmented.

15. A method as in claim 14 wherein vascular elements are selectively enhanced.

16. A method as in claim 15 where extracting includes extracting vascular features from a plurality of images.

17. A method as in claim 16 where carrying out includes for enrollment, storing at least some of the sequences with individual identifying indicia.

18. A method as in claim 17 where storing includes storing extracted vascular features from the plurality of images.

19. A method as in claim 16, where carrying out includes, for authentication, accessing at least two selected conjunctival biometrics for an identified individual and comparing the biometrics with representations of the vascular features.

20. A method as in claim 19, which includes establishing the authenticity of the individual.

21. A method as in claim 19 which includes comparing at least some of the stored sequences with acquired eye movement sequences of the individual's eyeball.

22. A method as in claim 19 where comparing includes carrying out one of correlation processing or pattern recognition processing.

23. A method as in claim 22 where correlation processing comprises carrying out multi-dimensional correlation processing.

24. A method as in claim 16 where carrying out includes, for identification carrying out at least one of correlation processing or pattern recognition between extracted vascular features and members of a biometric data base.

25. A system comprising:
an imaging device that produces digital representations of conjunctival regions of an individual's eyeball;
at least one programmable processor, the processor receives the digital representations;
a storage element coupled to the processor, the digital representations are stored in the element;
software recorded on a computer readable medium that segments the representations of the conjunctival regions, enhances vascular structures present in the segmented representations and processes the representations of the conjunctival regions to carry out one of, an enrollment process, an authentication process or an identification process.

26. A system as in claim 25 wherein the software forms at least one color specific representation of the conjunctival vasculatures.

27. A system as in claim 26 wherein the software enhances the color specific representation.

28. A system as in claim 27 which includes vascular feature extraction software.

29. A system as in claim 28 which includes one of correlation software or pattern recognition software for carrying out one of an authentication process or an identification process relative to the representation.

30. A system as in claim 28 which includes circuitry to output an indicator of the results of carrying out one of the enrollment process, the authentication process or the identification process.

31. Software recorded on a computer readable medium comprising:
first software that acquires vascular, non-retinal images of an individlial's eyeball;
second software that extracts vascular features from the images; and
third software that stores representations of the extracted features.

32. Software as in claim 31 which includes fourth software that evaluates a current representation of extracted vascular features relative to at least one stored representation in carrying out an authentication process.

33. Software as in claim 32 which evaluates a plurality of stored representations in carrying out an identification process.

34. Software as in claim 32 where the fourth software carries out at least one of a correlation function, or, a pattern recognition function in evaluating the current representation relative to the stored representation.

35. Software as in claim 34 which includes fifth software that generates as an output an indicator of the results of carrying out at least one of an enrollment process, the authentication process or an identification process.

* * * * *